United States Patent
Chabot

(10) Patent No.: US 10,311,621 B2
(45) Date of Patent: Jun. 4, 2019

(54) HELD OBJECT STABILIZATION IN VIRTUAL REALITY

(71) Applicant: Google Inc., Mountain View, CA (US)

(72) Inventor: Francois Chabot, Brossard (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/463,225

(22) Filed: Mar. 20, 2017

(65) Prior Publication Data

US 2018/0268590 A1  Sep. 20, 2018

(51) Int. Cl.
| | |
|---|---|
| G06F 3/01 | (2006.01) |
| G06T 13/20 | (2011.01) |
| G06T 13/40 | (2011.01) |
| G06T 15/08 | (2011.01) |
| G06T 17/10 | (2006.01) |
| G06T 19/20 | (2011.01) |

(52) U.S. Cl.
CPC .............. *G06T 13/40* (2013.01); *G06F 3/017* (2013.01); *G06T 13/20* (2013.01); *G06T 15/08* (2013.01); *G06T 17/10* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,236,403 | B1 | 5/2001 | Chaki et al. |
| 9,214,036 | B1 | 12/2015 | Kanyuk et al. |
| 2005/0219250 | A1 | 10/2005 | Sepulveda |
| 2008/0117216 | A1 | 5/2008 | Dorie |
| 2009/0262118 | A1* | 10/2009 | Arikan ................. G06T 13/40 345/473 |
| 2017/0032055 | A1* | 2/2017 | Eisemann ............ G06F 17/10 |
| 2017/0216718 | A1* | 8/2017 | Polzin ................. A63F 13/213 |

OTHER PUBLICATIONS

International Search Report and Written Opinion for International Application PCT/US2017/064146, dated Feb. 2, 2018, 17 pages.
(Continued)

*Primary Examiner* — Jeffrey J Chow
(74) *Attorney, Agent, or Firm* — Brake Hughes Bellermann LLP

(57) ABSTRACT

Techniques of animating objects in VR involve applying a motion filter to the object that varies with vertices on an object. Along these lines, a VR computer generates an object for an interactive, three-dimensional game by generating a triangular mesh approximating the object surface and bones including vertices defining motion of the vertices based on motion of an anchor vertex. When a user selects a vertex of the object as an anchor vertex about which to move the object, the VR computer generates variable filters for each bone that restrict the motion of that bone based on the distance of that bone from the anchor vertex. Accordingly, when the user produces a gesture with a controller that defines a path of motion for the anchor vertex, the bone including the anchor vertex goes through an unfiltered motion while bones remote from the anchor vertex go through a more restricted motion.

20 Claims, 7 Drawing Sheets

(56) References Cited

OTHER PUBLICATIONS

Azimi; "Skeletal Joint Smoothing White Paper"; 2015, XP002777288, 20 pages.
Foxlin; "Chapter 7. Motion Tracking Requirements and Technologies"; Extended draft version of Chapter 8 in Handbook of Virtual Environment Technology; 2002, XP002777287; 54 pages.
Teather et al.; "Effects of Tracking Technology, Latency, and Spatial Jitter on Object Movement"; IEEE Symposium on 3D User Interfaces, Mar. 14, 2009, XP031465525; pp. 43-50.

* cited by examiner

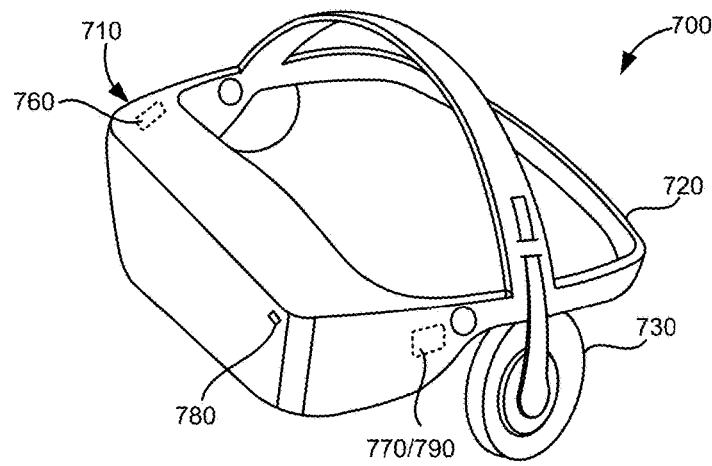
FIG. 7A
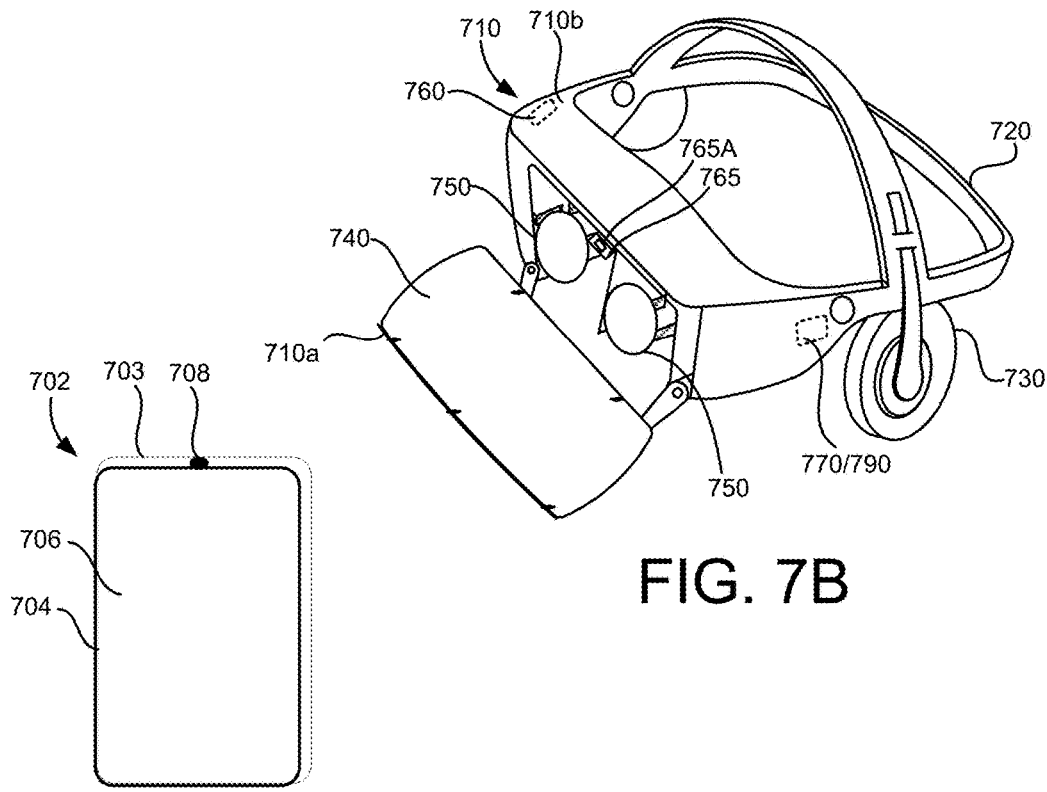
FIG. 7B
FIG. 7C

HELD OBJECT STABILIZATION IN VIRTUAL REALITY

TECHNICAL FIELD

This description generally relates to the representation of objects in virtual reality (VR).

BRIEF DESCRIPTION OF THE DRAWINGS

FIGS. 7A, 7B, and 7C are diagrams depicting the example VR HMD and an example controller.

Like reference symbols in the various drawings indicate like elements.

DETAILED DESCRIPTION

Figure 1:
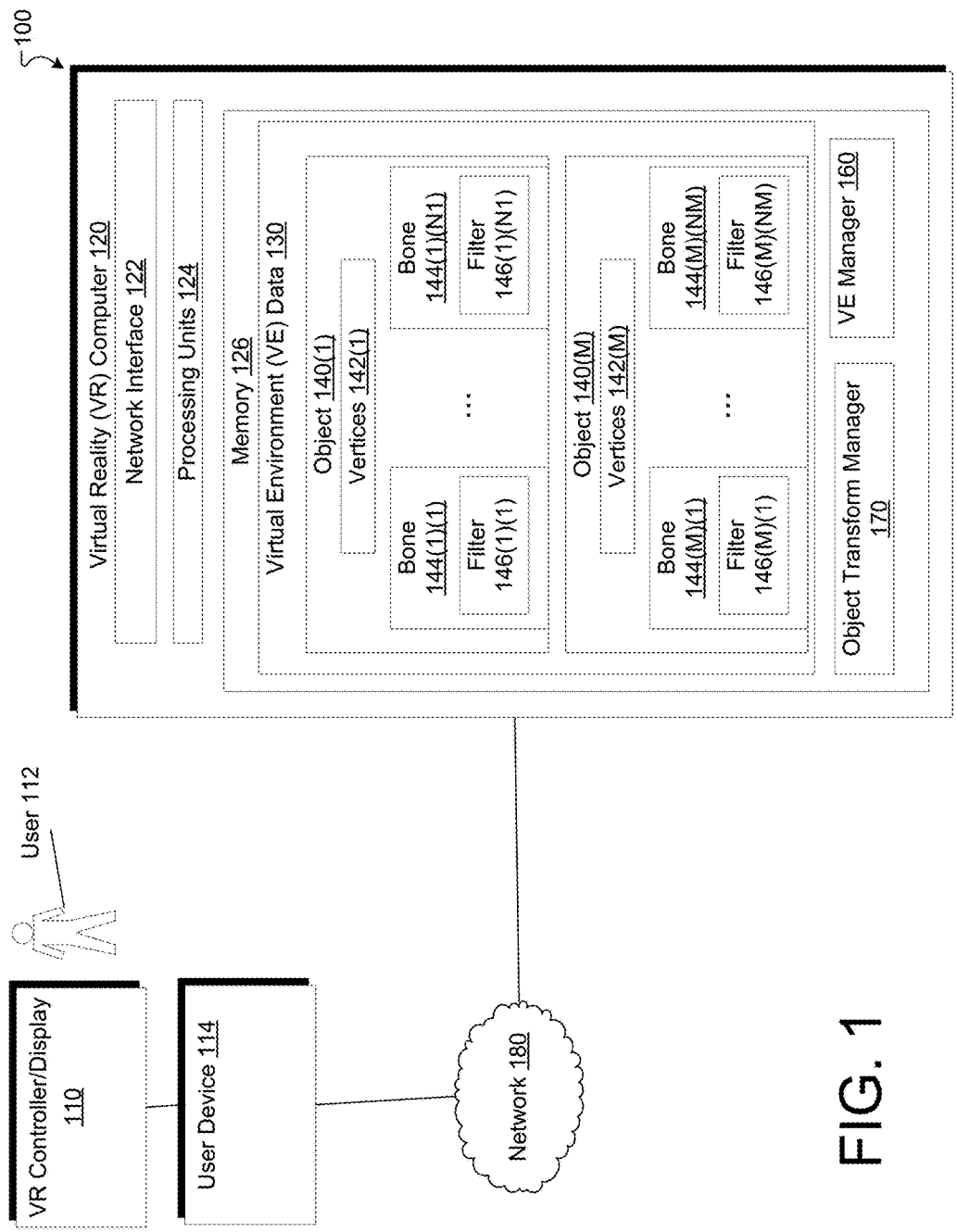
FIG. 1 is a block diagram of an example electronic environment for performing improved techniques described herein.

A virtual reality (VR) system that generates a virtual environment includes a VR computer and a controller. A human user experiences a virtual environment generated by the VR computer by interacting with various objects within the virtual environment. For example, the human user may use the controller to move an object through a translation and/or a rotation via a gesture. To provide a natural simulation of the motion of the object in response to a gesture from the human user, the VR computer performs an animation of the object according to a rigid transformation.

Approaches to animating objects can involve defining vertices of an object and rigid transformations of those vertices that represent movement of various parts of the object. In some cases, there is a filter applied to the rigid transformations to simulate mass of the object.

As a simple example, suppose that the object is a baseball bat. A baseball bat is a long, rigid object. If the bat is a single, rigid element, then the relative distance of each pair of points on the bat remains fixed through a motion (i.e., translation and rotation). That is, each point of the bat is translated the same amount and undergoes the same angle of rotation in response to translational and rotational motions.

Some approaches herein to animating objects in a virtual environment scale well to interactive animations such as those in virtual reality (VR). For example, the approaches may not account for sources of noise, including (i) measurement noise in hand-held controllers used by users to control objects in a virtual environment and (ii) natural hand vibrations. The noise sources produce unnaturally jittery motion in the virtual environment when the user holds the object relatively still.

The noise has a translational component and a rotational component. The rotational component of the noise is amplified for vertices far from a fixed anchor point, Larger objects are particularly sensitive to this rotational noise.

For example, referring back to bat example introduced above, the response of the bat to motion at one of its ends (i.e., a handle where a user nominally holds the bat) might not be uniform because the bat may not be perfectly rigid. Along these lines, the user may introduce rotational noise as he or she holds the bat. The rotational noise at the handle where the user holds the bat may be amplified at the other end of the bat farther away from the user. Such an amplified rotational noise may result in an unnatural look and feel of the bat as represented in the virtual environment.

Other, more complex objects such as people and animals may be modeled as having rigid elements ("bones") linked together by non-rigid elements. In the case of people and animals, the non-rigid elements may include joints and other connective tissue. In these cases, rotational noise at one point, e.g., a hand, may produce unnaturally large rotational noise at a remote point, e.g., a shoulder.

Simply filtering this rotational noise is undesirable. The rigidity of the attachment to the user's hand when the user is holding an object in VR is important to maintain presence. If the object were to start lagging behind the hand, either rotationally or positionally, the user experience would be tainted. The filter applied to the rigid transformations to simulate mass of the object may dampen such high-frequency motion at a fixed anchor point, but such a filter may make unintended vibrations away from the anchor point worse and compromise the user's experience.

The techniques of animating objects in VR described herein involve applying a motion filter to the object that varies with vertices on an object. Along these lines, a VR computer generates an object for an interactive, three-dimensional game by generating the triangular mesh approximating the surface of the object as well as rigid elements, or bones including vertices that define the motion of the vertices based on motion of an anchor vertex. For example, a bat may be represented by (e.g., modeled using) a single bone. As another example, an arm or hand of an avatar in a virtual environment may be represented by multiple connected bones.

A bone of an object is a rigid element that includes vertices of the object such that, when the bone moves, each vertex of the bone moves in the same way. When a user selects a vertex of the object as an anchor vertex about which to move the object, the VR computer generates variable filters for each bone that restrict the motion of that bone based on the distance of that bone from the anchor vertex. The filters may restrict that motion by reducing the amount of high-frequency motion associated with rotational noise. Accordingly, when the user produces a gesture with a controller that defines a path of motion for the anchor vertex, the bone including the anchor vertex goes through an unfiltered motion while bones remote from the anchor vertex go through a more restricted motion. Meanwhile, in an interior region of the object in which there are no bones, the vertices of the surface of the object may be smoothly deformed so that rigidity of the object remote from the anchor vertex is achieved during motion. Nevertheless, the VR computer may perform a dual quaternion skinning operation that preserves the volume of the interior region of the object.

In some implementations, a dual object is a mathematical object of the form $f + \in g$, where $\in^2 = 0$. That is, for example, $(f + \in g)^2 = f^2 + \in \cdot 2fg$. A quaternion is a quantity of the form $a + b\hat{i} + c\hat{j} + d\hat{k}$, where $\hat{i}\hat{j} = \hat{k}$, $\hat{j}\hat{k} = \hat{i}$, $\widehat{k\hat{i}}$, $= \hat{j}$ are quaternion units, and $\hat{i}^2 = \hat{j}^2 = \hat{k}^2 = -1$, with multiplication of the quarternion units being anticommutative. Accordingly, a dual quarternion is a quarternion in which the quantities a,b,c,d are dual objects. Representing the various rotational and translational operations with dual quarternions allows transformations of non-rigid portions of an object that preserve volume.

FIG. 1 is a block diagram depicting an example electronic environment 100 according to the improved techniques described herein. The electronic environment 100 includes a user 112 with a VR controller and display 110, a VR computer 120, and a network 180.

The VR controller 110 may take the form of a head-mounted display (HMD) which is worn by the user 112 to provide an immersive virtual environment. In the example electronic environment 100, the user 112 that wears the VR controller 110 holds a user device, i.e., user device 114. The user device 114 may be, for example, a smartphone, a controller, a joystick, or another portable handheld electronic device(s) that may be paired with, and communicate with, the VR controller 110 for interaction in the immersive virtual environment. The user device 114 may be operably coupled with, or paired with the VR controller 110 via, for example, a wired connection, or a wireless connection such as, for example, a WiFi or Bluetooth connection. This pairing, or operable coupling, of the user device 114 and the VR controller 110 may provide for communication between the user device 114 and the VR controller 110 and the exchange of data between the user device 114 and the VR controller 110. This may allow the user device 114 to function as a controller in communication with the VR controller 110 for interacting in the immersive virtual environment. That is, a manipulation of the user device 114, such as, for example, a beam or ray emitted by the user device 114 and directed to a virtual object or feature for selection, and/or an input received on a touch surface of the user device 114, and/or a movement of the user device 114, may be translated into a corresponding selection, or movement, or other type of interaction, in the immersive virtual environment provided by the VR controller 110.

The VR computer 120 is configured to generate virtual environment (VE) data 130 for the immersive virtual environment and transmit that data to the user device 114 over the network 180. As illustrated in FIG. 1, the VR computer 120 is implemented as a computer system that is in communication with the user device 114 over the network 180.

The VR computer 120 includes a network interface 122, a set of processing units 124, memory 126, and a signal receiver 128. The network interface 122 includes, for example, Ethernet adaptors, Token Ring adaptors, and the like, for converting electronic and/or optical signals received from the network 180 to electronic form for use by the virtual environment computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the VR computer 120 can be, or can include processors (e.g., processing units 124) configured to process instructions stored in the memory 126. Examples of such instructions as depicted in FIG. 1 include a virtual environment manager 160 and an object transform manager 170. The memory 126 may also store various data passed by the processors into routines realized by the instructions. As depicted in FIG. 1, such data include the VE data 130, which in turn includes object data 140(1), . . . , 140(M).

The VE manager 160 is configured to generate VE data 130 to be realized as the immersive virtual environment by the VR controller 110. For example, when the VR computer 120 is configured to process data for an interactive, immersive game, the VE data 130 generated by the VR computer 120 may include some background data that renders as the walls of a room or an outdoor environment. In addition, the VE data 130 also includes a set of objects 140(1), . . . , 140(M) with which the user 112 may interact via the VR controller 110. The VR computer 120 may render any of the objects 140(1), . . . , 140(M) onto the display/controller 110 for viewing by the user 112.

Each object, e.g., object 140(1), represents some physical object within the virtual environment. For example, if the VR computer 120 is processing a dart game, one virtual object may be a dart, another a dartboard. In such a game, the user 112, via the controller 110, may interact with the object 140(1) via an avatar of the controller. Along these lines, the user 112 moves the controller 110 to a point on the object 140(1), i.e., an anchor vertex. The user may then manipulate the object 140(1) by a series of gestures with the controller. That is, each gesture may be interpreted by the VR computer 120 as a command to move the object 140(1) along a certain path.

The object 140(1) includes a plurality of vertices 142(1) that define the surface of the object 140(1). Typically, the VR computer 120 constructs the object 140(1) from a triangular mesh in three-dimensional space. Each of the vertices of the triangular mesh then forms a vertex 142(1) of the surface of the object 140(1).

In principle, when the object 140(1) is fully rigid, the movement of the object 140(1) through a path is represented by a rigid transformation of each of the vertices 142(1). The movement typically has a translational component and a rotational component. In some implementations, the movement may be represented as a series of matrices added and/or multiplied together. In other implementations, however, such motion may be represented by dual quaternions.

In most cases, however, the object 140(1) is not truly rigid and some deformation may be expected. For example, portions of the objects between bones may not be rigid and the vertices in such portions may all move differently with respect to one another. In these cases, the object also contains a set of bones, i.e., rigid elements 144(1)(1), . . . , 144(1)(N1), each of which are rigid parts of the object 140(1) and have at least one vertex 142(1) of the surface of the object. Instead of associating a transformation with each vertex, a transformation is associated with each bone, e.g., bone 144(1)(1). The vertices of each bone move according to the transformation to the bone. For example, if the bone is rotated, each of the vertices, which are fixed to the respective ends of the bone will rotate with the bone. As another example, if the bone is translated, each of the vertices, which are fixed to the respective ends of the bone will be translated with the bone. If one end of the bone is moved more than another end of the bone, then one vertex will be moved more than the other vertex based on the movement of the bone.

Figure 3:
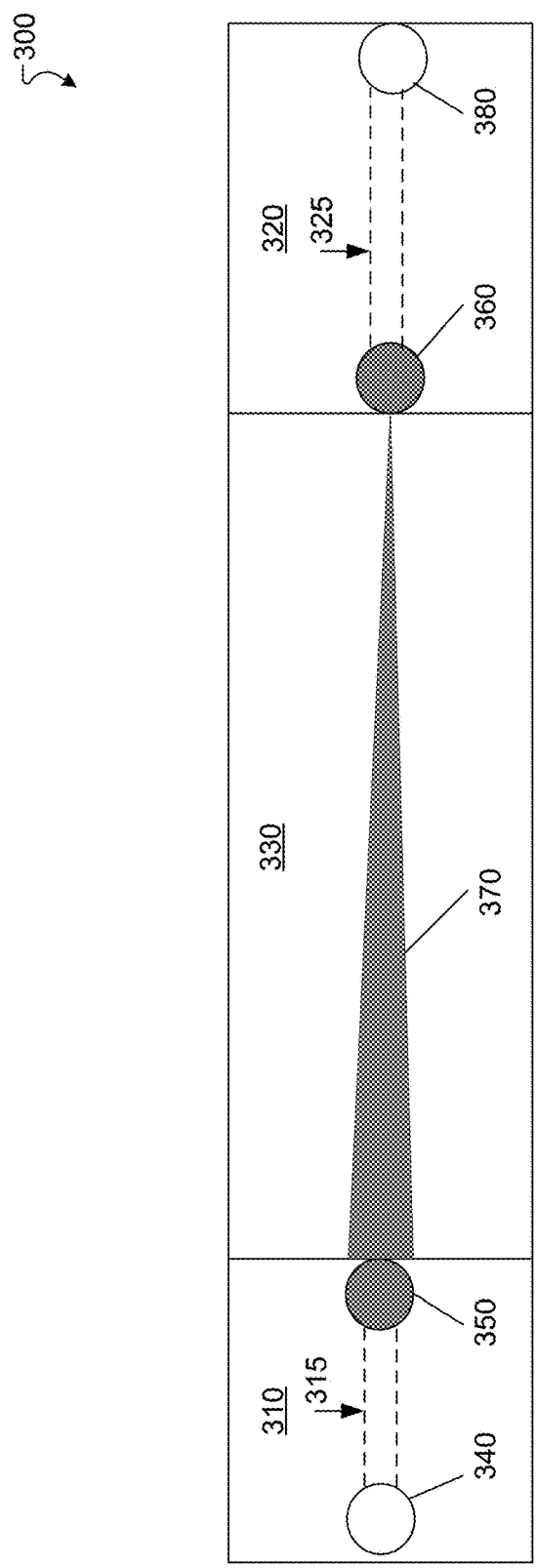
FIG. 3 is a diagram depicting an example filtering of an object within the electronic environment shown in FIG. 1.

An example of a bone is illustrated in FIG. 3. In FIG. 3, an elongated object 300 is shown. The object 300 has two bones, 315 and 325 in respective, rigid regions 310 and 320. Each of these bones 315, 325 is represented as dashed lines because the bones are not a real portion of the object 300 but rather a device that helps visualize how some portions of the object 300 move. Each of the bones, e.g., bone 315, has two vertices: an anchor vertex 340 and a second vertex 350 that is adjacent to a non-rigid region 330 of the object. For example, suppose again that the object is a baseball bat. A user would hold the bat at one end (the handle), at point 340. Any sort of noise induced in the motion of an anchor vertex at this end might cause very large amounts of rotational noise at point 380 at the other end of the bat. Nevertheless, by filtering at the far end (point 380) differently than at the handle or close end (point 340), then such filters that dampen motion at the point 380 can be used to reduce or eliminate that jitter at the point 380. Referring back to FIG. 1, because it has been found that motion under which bones remote from the anchor vertex move is more sensitive to noise (e.g., natural human hand jitter as well as machine-induced noise from the controller 110), each bone 144(1)(1) has its own respective motion filter 146(1)(1). The filters 146(1)(1), . . . , 146(1)(N1) may then be different. In some implementations, the filters 146(1), . . . , 146(1)(N1), dampen such noise in the motion according to a distance from an anchor vertex. For the bone including the anchor vertex, e.g., bone 144(1)(N1), the motion may be unfiltered, i.e., the filter 146(1)(N1) is represented by an identity transformation.

Each of the filters 146(1)(1) may take the form of a dual-quaternion quantity that multiplies or otherwise modifies a dual quaternion transformation that represents the motion of a bone 144(1)(1). In some implementations, the filter 146(1)(1) may take the form of a constant damping term. In other implementations, the filter 146(1)(1) may take the form of a low-pass filter in frequency space that dampens or eliminates high-frequency motion such as jitter.

The object transform manager 170 is configured to transform a selected object, e.g., object 140(1)(1) in response to a gesture from the user 112 via the controller 110. As discussed above, the gesture is interpreted by the VR computer 120 as a request to move the object along a translational and rotational path.

The object transform manager 170 is also configured to generate and apply a filter 146(1)(1) to each of the bones 144(1)(1). Each filter may be computed, in some implementations, based on a distance from an anchor vertex. The application of the filter may be a matrix, quaternion, or dual quaternion multiplication.

The network 180 is configured and arranged to provide network connections between the VR controller 110 and the virtual environment computer 120. The network 180 may implement any of a variety of protocols and topologies that are in common use for communication over the Internet or other networks. Further, the network 180 may include various components (e.g., cables, switches/routers, gateways/bridges, etc.) that are used in such communications.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the virtual environment computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the virtual environment computer 120.

In some implementations, the VR computer 120 can be, for example, a wired device and/or a wireless device (e.g., WiFi enabled device) and can be, for example, a computing entity (e.g., a personal computing device), a server device (e.g., a web server), a mobile phone, a touchscreen device, a personal digital assistant (PDA), a laptop, a television, a tablet device, e-reader, and/or so forth. Such device(s) can be configured to operate based on one or more platforms (e.g., one or more similar or different platforms) that can include one or more types of hardware, software, firmware, operating systems, runtime libraries, and/or so forth.

The components (e.g., modules, processing units 124) of the VR computer 120 can be configured to operate based on one or more platforms (e.g., one or more similar or different platforms) that can include one or more types of hardware, software, firmware, operating systems, runtime libraries, and/or so forth. In some implementations, the components of the VR computer 120 can be configured to operate within a cluster of devices (e.g., a server farm). In such an implementation, the functionality and processing of the components of the VR computer 120 can be distributed to several devices of the cluster of devices.

The components of the VR computer 120 can be, or can include, any type of hardware and/or software configured to process attributes. In some implementations, one or more portions of the components shown in the components of the VR computer 120 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the VR computer 120 can be, or can include, a software module configured for execution by at least one processor (not shown). In some implementations, the functionality of the components can be included in different modules and/or different components than those shown in FIG. 1.

Although not shown, in some implementations, the components of the VR computer 120 (or portions thereof) can be configured to operate within, for example, a data center (e.g., a cloud computing environment), a computer system, one or more server/host devices, and/or so forth. In some implementations, the components of the VR computer 120 (or portions thereof) can be configured to operate within a network. Thus, the components of the VR computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Figure 2:
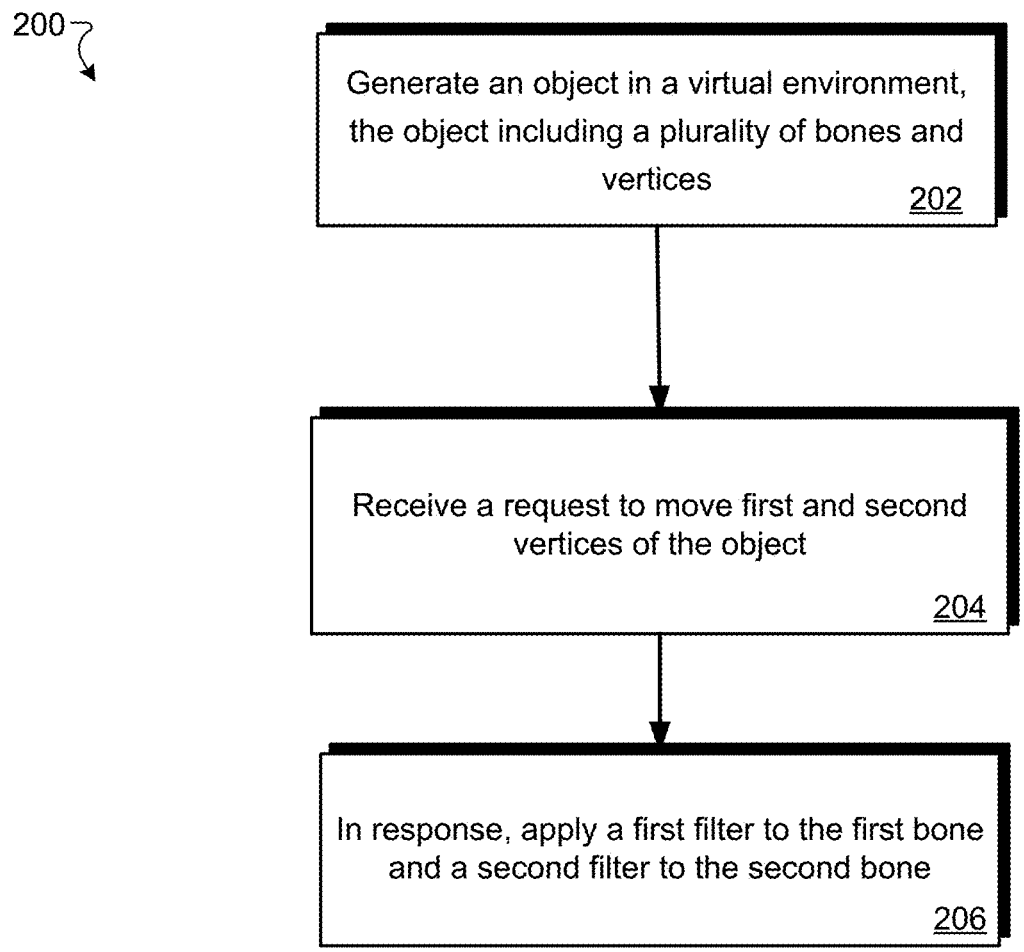
FIG. 2 is a flow chart depicting an example method according to the improved techniques.

FIG. 2 is a flow chart depicting an example method 200 of animating an object in a virtual environment. The method 200 may be performed by software constructs described in connection with FIG. 1, which reside in memory 126 of the VR computer 120 and are run by the set of processing units 124.

At 202, the VR computer 120 generates an object in a virtual environment. The object has a surface and includes a plurality of bones. The surface of the object includes a plurality of vertices. Each of the plurality of vertices is included in a respective bone of the plurality of bones. Each of the plurality of bones defines a motion of each vertex of that bone according to a rigid transformation.

At 204, the VR computer 120 receives a request to move a first vertex of the surface of the object included in a first bone of the plurality of bones and a second vertex of the surface of the object included in a second bone of the plurality of bones.

At 206, the VR computer 120, in response to the request, applies a first filter to a first bone of the set of bones and a second filter to a second bone of the set of bones. Each of the first filter and the second filter, upon respective application to the first bone and the second bone, restricts the motion of the first vertex of the first bone by a first amount and restricts the motion of the second vertex by a second amount different from the first amount.

Based on the filtering described above, an object that has portions far from an anchor point can be stable to, for example, rotational noise. Without the use of such distance-dependent filters, portions relatively far from an anchor point can have rotational noise that tend to be amplified at the distant vertices. Accordingly, a filter at a remote point would dampen the motion at the remote point relative to the motion at a near point. For example, suppose that the object is a baseball bat. A user would hold the bat at one end (the handle). Any sort of rotational noise induced in the motion of an anchor vertex at this end might cause there to be very large, noisy rotational motions at the other end of the bat. Nevertheless, by filtering at the far end differently than at the handle, then the filters can be used to dampen, i.e., reduce high-frequency motion associated with the rotational noise at the far end with respect to motion at the near end.

In typical cases, such non-uniform filtering may cause the object in intermediate, non-rigid regions to deform. That said, the deformation of the object in such non-rigid regions can be controlled, as will be described in connection with FIGS. 3 and 4 below.

FIG. 3 is a diagram depicting an example filtering of an object 300. As shown in FIG. 3, the object 300 is divided into three distance ranges, or regions. This division is a model of an object having two bones and a non-rigid connector between these bones.

The first region 310 has a first bone 315 which in turn includes an anchor vertex 340 and an interior endpoint 350. The second region 320 has a bone 325 which in turn includes a remote vertex 380 of the surface of the object 300 and an interior endpoint 360. The third region 330, in between the first and second regions, is non-rigid and has no bone. Rather, the surface 370 includes vertices of the object 300 that may move differently with respect to one another and may be deformed.

Upon receipt of a command to move the object 300 with respect to the anchor vertex 340 (e.g., a gesture from a human user that moves the anchor point 340 and, hence, the bone 315 and vertex 350), the VR computer 120 (FIG. 1), via the object transform manager 170, computes the rigid transformation to move the bone 315 that includes the anchor vertex 340 to a final point along a path as well as the bone that contains the remote vertex 380 to another destination based on its initial position and orientation. The object transform manager 170 also generates a filter for the bone 325 including the remote vertex 380 so as to dampen high-frequency jitter.

The object 300 illustrated in FIG. 3 is highly directional, while many objects in a virtual environment may not be so. For the general case of objects possessing both high and low degrees of directionality, it has been found to be advantageous to define the bone in region 320, i.e., the bone 325 including the remote vertex 380, to be identical to the bone 315 in the region 310, i.e., that including the anchor vertex 340. This would limit the VR computer 120 to filtering against a rotation around the anchor point, while at the same time the VR computer 120 would be able to handle arbitrary objects and not just highly directional ones.

In rigging terms, all vertices between the anchor vertex 340 and the endpoint 350 are 100% mapped to the anchor's transform; all vertices past the endpoint 360 are 100% mapped to the filtered (remote) transform, and vertices between points 350 and 360 may be mapped using a regular function using the distance between the vertex and the anchor point as input.

Figure 4:
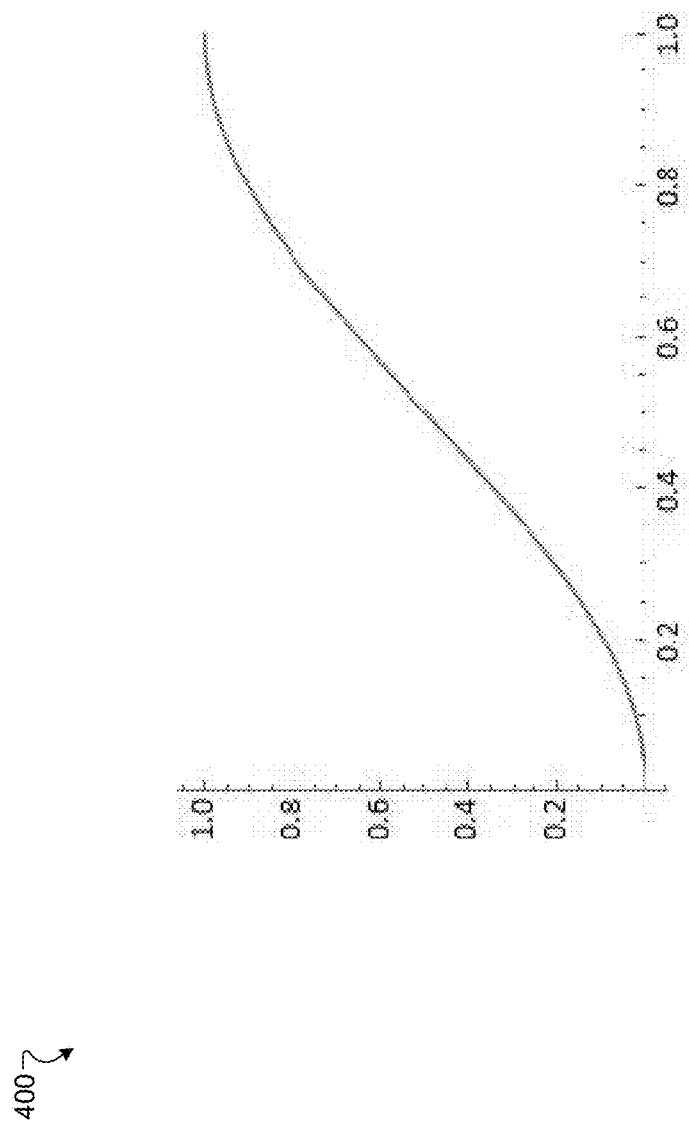
FIG. 4 is a diagram depicting another example deformation of an object within the electronic environment shown in FIG. 1.

FIG. 4 is a diagram depicting an example mapping function 400 used to map the vertices in region 330 (FIG. 3). In order to avoid artifacts, the mapping function may not introduce discontinuities in the surface. Thus, the object transform manager 170 may generate a weight mapping function that has a zero slope at the endpoints 350 and 360.

As illustrated in FIG. 4, the weight mapping function takes the form $f(x)=\sin^2(\pi/2x)$ when the distance along an axis of symmetry (i.e., a horizontal axis) in the non-rigid region 330 is mapped to the interval [0,1]. In this way, vertices further away from the endpoint 350 and closer to the endpoint 360, i.e., further away from the anchor vertex, experience more distortion.

Returning to FIG. 3, such distortion as introduced in region 330 by the weight mapping function 400 is illustrated as the distorted surface 370 in region 330. Here, the surface of the object 300 is tapered in this non-rigid region. Note that the actual taper will have cylindrical ends so as to satisfy the constraint of zero slope at the endpoints 350 and 360.

In some arrangements, the filter for the bone in region 320 may take the form of an asymptotic filter with a filtering ratio proportional to a current angular distance between the unfiltered and previously filtered orientations. For example, suppose again that the object is the elongated object 300 (e.g., an animal leg) subject to rotational noise at the far end at point 380. Then the asymptotic filter damps motion at the point 380 proportional to the difference in angle between unfiltered and previously filtered motion due to the rotational noise ("diff"). This filter restricts (e.g., dampens) the motion at the far end according to this filtering ratio ("strength_pct") and dampens the effect of the rotational noise. Accordingly, application of this filter will cause the animal leg to be stable at both ends in response to rotational noise at one end. In this case, some pseudocode describing a computation of such a filter might take the following form.

```
dual_quat filt = get_unfiltered_transform( );
min_angle = degrees (2)
max_angle = degrees (8)
filt_min = 0.1
filt_max = 0.8
while(1) {
  // update here...
  dual_quat_unfilt = get_unfiltered_transform( ); // relative to the anchor
  diff = angle(filt.q, unfilt.q);
  // Compensate for pi-crossings.
  if (diff > pi) {
    diff = abs (diff - two_pi);
    filt.q * = -1.0;
  }
  strength_pct = clamp((diff - min_angle) / (max_angle - min_angle), 0, 1)
  filt = mix(filt, unfilt, mix(filt_min, filt_max, strength_pct));
  //render various viewports here...
}
```

In some arrangements, the object transform manager 170 performs a skinning operation on the object 300. Skinning is a process that involves associating a portion of the surface of an object, i.e., a skin, with a bone of the object. In an object having many, independently movable bones, some portions of the skin may be associated with more than one bone, e.g., the skin associated with a joint between two bones of an animal leg.

In some implementations, the object transform manager 170 uses a dual quaternion skinning in order to take advantage of certain volume-preserving properties of such a transformation. In this case, some pseudocode describing such a skinning operation might take the following form. As the pseudocode makes clear, the mapping function only alters the vertex positions and not vertex normals so that the distortion in the non-rigid region 330 is not obvious (or perceptible) to the user.

As an example, an animal leg has two bones 315 and 325 and a non-rigid region 330 between these bones 315 and 325. A skinning operation in the non-rigid region 330 (i.e., a joint between the bones) might be affected by unfiltered rotation noise at the point 380, as the skin would be associated with the noisy motions resulting in the bone 325. By damping the rotational noise as described above and introducing the weight function defined with respect to FIG. 4, a skinning process may be performed to map out the distortion of the surface of the object 300 in between the bones 315 and 325.

```
#define dual_quat mat2x4
uniform float influence_start;
uniform float influence_end;
uniform dual_quat filtered_dq;
uniform mat4 object_to_anchor; uniform mat4 anchor_to_object;
/*precomputed version of inverse(object_to_anchor)*/
float weight_map(float v) {
    /* Insert easing function such as that described in FIG. 4 */
}
vec4 dquat_transform(dual_quat dq, vec4 v) {
    /* Insert known dual quaternion transformation code */
}
/* Notice that only the vertex position is altered, and not the per-
vertex normal. This helps in hiding the distortion. */
vec4 distort(vec4 vertex) {
    vec4 v = object_to_anchor * vertex;
    dual_quat unfiltered = unit_dquat;
    float weight = weight_map(clamp(
    (length(v)    -  influence_start)   /  (influence_end  -
influence_start),
    0 , 1));
    dual_quat distortion = mix(unfiltered, filtered_dq, weight);
    return anchor_to_object * dquat_transform(distortion, v);
}
```

Figure 5:
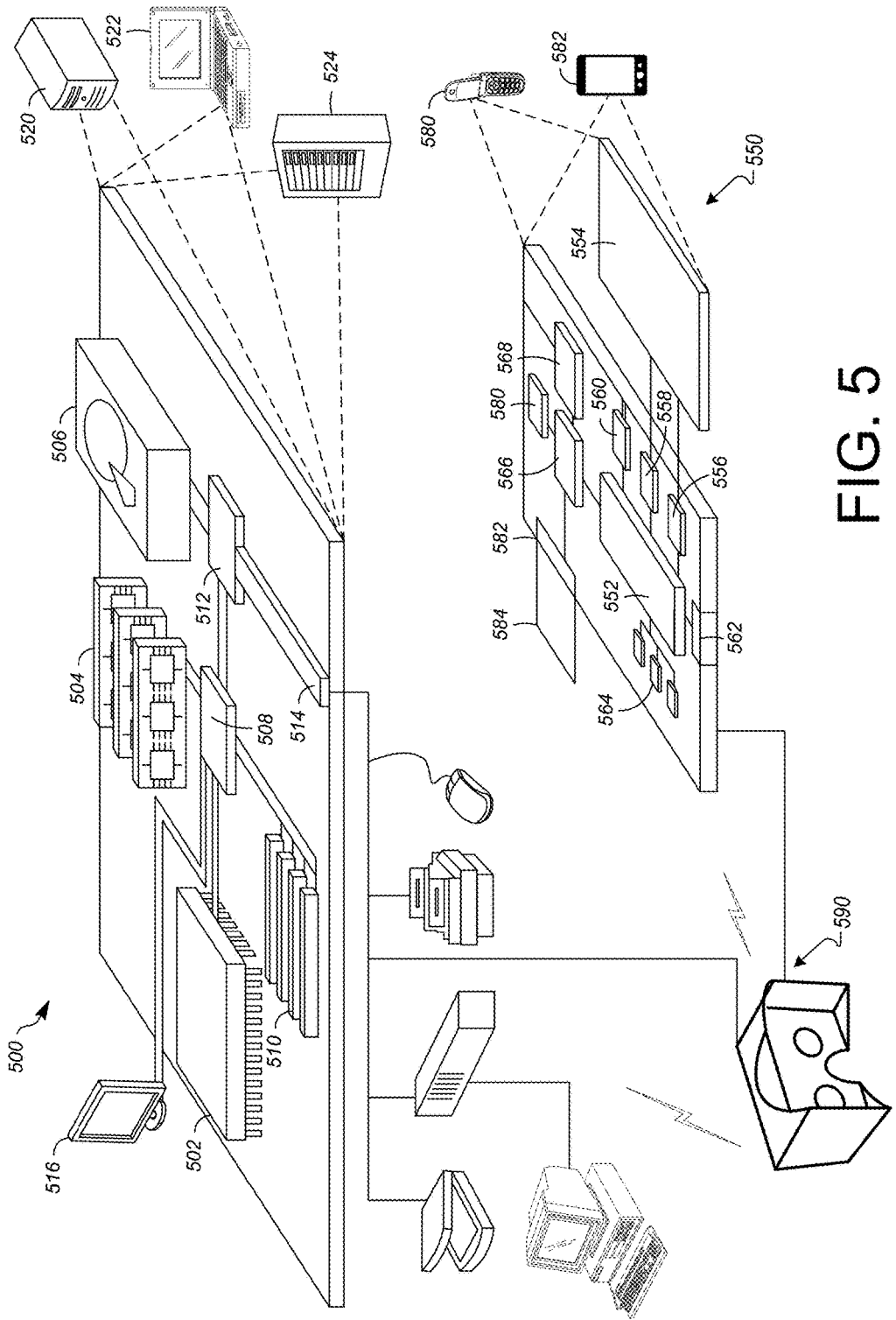
FIG. 5 is a diagram depicting an example of a computer device that can be used to implement the improvement described herein.

FIG. 5 shows an example of a generic computer device 500 and a generic mobile computer device 550, which may be used with the techniques described here in the context of applications involving VR. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 850, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset 590). For example, one or more sensors included on a computing device 550 or other computing device depicted in FIG. 5, can provide input to VR headset 590 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 550 can use the sensors to determine an absolute position and/or a detected rotation of the computing device in the VR space that can then be used as input to the VR space. For example, the computing device 550 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 550 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the VR space can cause a particular action to occur in the VR space.

In some implementations, a touchscreen of the computing device 550 can be rendered as a touchpad in VR space. A user can interact with the touchscreen of the computing device 550. The interactions are rendered, in VR headset 590 for example, as movements on the rendered touchpad in the VR space. The rendered movements can control objects in the VR space.

In some implementations, one or more output devices included on the computing device 550 can provide output and/or feedback to a user of the VR headset 590 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the VR space. In the example of the laser pointer in a VR space, the computing device 550 appears as a virtual laser pointer in the computer-generated, 3D environment. As the user manipulates the computing device 550, the user in the VR space sees movement of the laser pointer. The user receives feedback from interactions with the computing device 850 in the VR space on the computing device 550 or on the VR headset 590.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Figure 6:
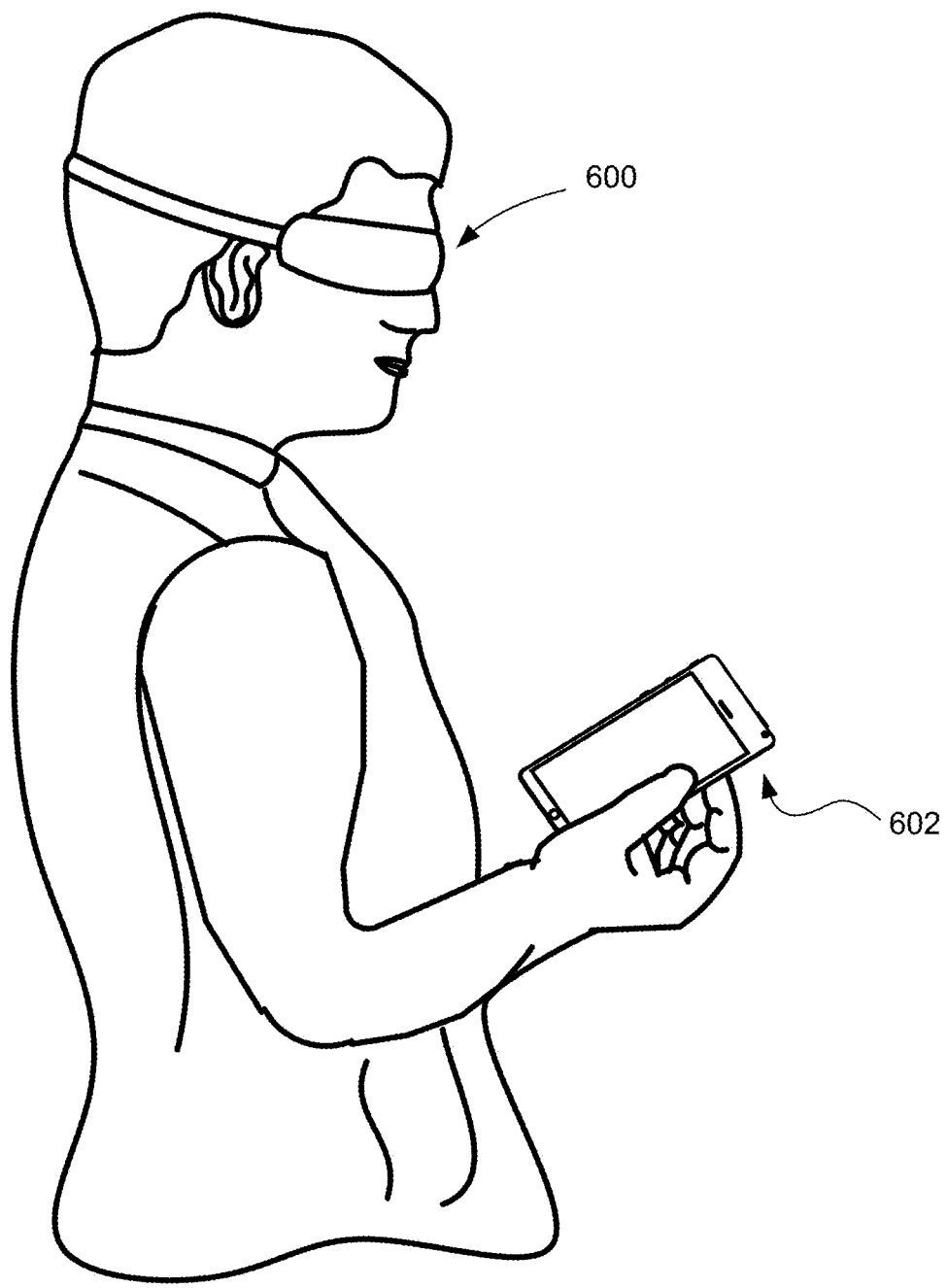
FIG. 6 is a diagram depicting an example head mounted display (HMD) for use in a virtual reality (VR) environment.

FIG. 6 illustrates an example implementation of a head-mounted display as shown in FIGS. 3 and 4. In FIG. 6, a user wearing an HMD 600 is holding a portable handheld electronic device 602. The handheld electronic device 602 may be, for example, a smartphone, a controller, a joystick, or another portable handheld electronic device(s) that may be paired with, and communicate with, the HMD 600 for interaction in the immersive virtual environment generated by the HMD 600. The handheld electronic device 602 may be operably coupled with, or paired with the HMD 600 via, for example, a wired connection, or a wireless connection such as, for example, a WiFi or Bluetooth connection. This pairing, or operable coupling, of the handheld electronic device 602 and the HMD 600 may provide for communication between the handheld electronic device 602 and the HMD 600 and the exchange of data between the handheld electronic device 602 and the HMD 600. This may allow the handheld electronic device 602 to function as a controller in communication with the HMD 600 for interacting in the immersive virtual environment generated by the HMD 600. That is, a manipulation of the handheld electronic device 602, such as, for example, a beam or ray emitted by the handheld electronic device 602 and directed to a virtual object or feature for selection, and/or an input received on a touch surface of the handheld electronic device 602, and/or a movement of the handheld electronic device 602, may be translated into a corresponding selection, or movement, or other type of interaction, in the immersive virtual environment generated by the HMD 600. For example, the HMD 600, together with the handheld electronic device 602, may generate a virtual environment as described above, and the handheld electronic device 602 may be manipulated to effect a change in scale, or perspective, of the user relative to the virtual features in the virtual environment as described above.

FIGS. 7A and 7B are perspective views of an example HMD, such as, for example, the HMD 600 worn by the user in FIG. 6, and FIG. 7C illustrates an example handheld electronic device, such as, for example, the handheld electronic device 602 shown in FIG. 6.

The handheld electronic device 702 may include a housing 703 in which internal components of the device 702 are received, and a user interface 704 on an outside of the housing 703, accessible to the user. The user interface 704 may include a touch sensitive surface 706 configured to receive user touch inputs. The user interface 704 may also include other components for manipulation by the user such as, for example, actuation buttons, knobs, joysticks and the like. In some implementations, at least a portion of the user interface 704 may be configured as a touchscreen, with that portion of the user interface 704 being configured to display user interface items to the user, and also to receive touch inputs from the user on the touch sensitive surface 706. The handheld electronic device 702 may also include a light source 708 configured to selectively emit light, for example, a beam or ray, through a port in the housing 703, for example, in response to a user input received at the user interface 704.

The HMD 700 may include a housing 710 coupled to a frame 720, with an audio output device 730 including, for example, speakers mounted in headphones, also be coupled to the frame 720. In FIG. 7B, a front portion 710a of the housing 710 is rotated away from a base portion 710b of the housing 710 so that some of the components received in the housing 710 are visible. A display 740 may be mounted on an interior facing side of the front portion 710a of the housing 710. Lenses 750 may be mounted in the housing 710, between the user's eyes and the display 740 when the front portion 710a is in the closed position against the base portion 710b of the housing 710. In some implementations, the HMD 700 may include a sensing system 760 including various sensors and a control system 770 including a processor 790 and various control system devices to facilitate operation of the HMD 700.

In some implementations, the HMD 700 may include a camera 780 to capture still and moving images. The images captured by the camera 780 may be used to help track a physical position of the user and/or the handheld electronic device 702 in the real world, or physical environment relative to the virtual environment, and/or may be displayed to the user on the display 740 in a pass through mode, allowing the user to temporarily leave the virtual environment and return to the physical environment without removing the HMD 700 or otherwise changing the configuration of the HMD 700 to move the housing 710 out of the line of sight of the user.

In some implementations, the HMD 700 may include a gaze tracking device 765 to detect and track an eye gaze of the user. The gaze tracking device 765 may include, for example, an image sensor 765A, or multiple image sensors 765A, to capture images of the user's eyes, for example, a particular portion of the user's eyes, such as, for example, the pupil, to detect, and track direction and movement of, the user's gaze. In some implementations, the HMD 700 may be configured so that the detected gaze is processed as a user input to be translated into a corresponding interaction in the immersive virtual experience.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
generating, by processing circuitry of a virtual reality (VR) computer, an object in a virtual environment, the object having a surface and including a first bone including a first vertex and a second bone including a second vertex, the first bone defining a motion of the first vertex according to a rigid transformation that preserves distances between points on the first bone;
receiving a request to move the first vertex of the surface of the object included in the first bone and the second vertex of the surface of the object included in the second bone;
in response to the request, applying a first filter to the first bone and a second filter to the second bone, each of the first filter and the second filter, upon respective application to the first bone and the second bone, restricting the motion of the first vertex of the first bone by a first amount and dampening the motion of the second vertex by a second amount different from the first amount.

2. The method as in claim 1, wherein receiving the request includes defining an anchor vertex, the anchor vertex being included in the first bone;
wherein the motion includes a translation component and a rotation component; and
wherein the first filter is an identity filter that, when applied to the first bone, dampens the translation component of the motion of the anchor vertex by zero distance and dampens the rotation component of the motion of the anchor vertex by zero angle so that the anchor vertex moves along a path according to the rigid transformation.

3. The method as in claim 2, wherein the object includes a first region that includes the anchor vertex, a second region including the second vertex, and a third region between the first region and the second region in which the object is deformed, the second vertex being remote from the anchor vertex, and
wherein the method further comprises performing a deformation operation on vertices within the third region to produce a deformed object with in the third region.

4. The method as in claim 3, wherein performing the deformation operation on the vertices within the third region includes mapping a position of each of the vertices within the third region according to a continuous mapping function, the continuous mapping function having a zero slope at boundaries between the first region and the third region and between the second region and the third region.

5. The method as in claim 2, wherein generating the object in the virtual environment includes defining the second bone to be identical to the first bone in a bind pose of the object.

6. The method as in claim 5, wherein applying the second filter to the second bone includes defining the filter as an asymptotic filter having a filtering ratio proportional to a current angular distance between a position of a vertex of the second bone due to unfiltered motion of the vertex and a position of the vertex due to motion in response to application of a previous filter of the second bone.

7. The method as in claim 5, wherein the rigid transformation defining the motion of each vertex attached to a bone of the plurality of bones includes a dual quaternion representation of a coordinate transformation, and
wherein the method further comprises performing a skinning operation on the third region after applying the second filter to the second bone to preserve a volume of the object in the third region.

8. The method as in claim 1, further comprising displaying the object in a display configured to render the virtual environment for viewing by a user of the VR computer.

9. A computer program product comprising a nontransitive storage medium, the computer program product including code that, when executed by processing circuitry of a virtual reality (VR) computer, causes the processing circuitry to perform a method, the method comprising:

generating an object in a virtual environment, the object having a surface and including a first bone including a first vertex and a second bone including a second vertex, the first bone defining a motion of the first vertex according to a rigid transformation that preserves distances between points on the first bone;

receiving a request to move the first vertex of the surface of the object included in the first bone and the second vertex of the surface of the object included in the second bone;

in response to the request, applying a first filter to the first bone and a second filter to the second bone, each of the first filter and the second filter, upon respective application to the first bone and the second bone, dampening the motion of the first vertex of the first bone by a first amount and dampening the motion of the second vertex by a second amount different from the first amount.

10. The computer program product as in claim 9, wherein receiving the request includes defining an anchor vertex, the anchor vertex being included in the first bone;

wherein the motion includes a translation component and a rotation component; and wherein the first filter is an identity filter that, when applied to the first bone, dampens the translation component of the motion of the anchor vertex by zero distance and dampens the rotation component of the motion of the anchor vertex by zero degrees so that the anchor vertex moves along a path according to the rigid transformation.

11. The computer program product as in claim 10, wherein the object includes a first region that includes the anchor vertex, a second region including the second vertex, and a third region between the first region and the second region in which the object is deformed, the second vertex being remote from the anchor vertex, and wherein the method further comprises performing a deformation operation on vertices within the third region to produce a deformed object with in the third region.

12. The computer program product as in claim 11, wherein performing the deformation operation on the vertices within the third region includes mapping a position of each of the vertices within the third region according to a continuous mapping function, the continuous mapping function having a zero slope at boundaries between the first region and the third region and between the second region and the third region.

13. The computer program product as in claim 10, wherein generating the object in the virtual environment includes defining the second bone to be identical to the first bone in a bind pose of the object.

14. The computer program product as in claim 13, wherein applying the second filter to the second bone includes defining the filter as an asymptotic filter having a filtering ratio proportional to a current angular distance between a position of a vertex of the second bone due to unfiltered motion of the vertex and a position of the vertex due to motion in response to application of a previous filter of the second bone.

15. The computer program product as in claim 13, wherein the rigid transformation defining the motion of each vertex attached to a bone of the plurality of bones includes a dual quaternion representation of a coordinate transformation, and wherein the method further comprises performing a skinning operation on the third region after applying the second filter to the second bone to preserve a volume of the object in the third region.

16. The computer program product as in claim 9, wherein the method further comprises displaying the object in a display configured to render the virtual environment for viewing by a user of the VR computer.

17. A virtual reality (VR) computer, comprising:
memory; and
controlling circuitry coupled to the memory, the controlling circuitry being configured to:

generate an object in a virtual environment, the object having a surface and including a first bone including a first vertex and a second bone including a second vertex, the first bone defining a motion of the first vertex according to a rigid transformation that preserves distances between points on the first bone;

receive a request to move the first vertex of the surface of the object included in the first bone and the second vertex of the surface of the object included in the second bone;

in response to the request, apply a first filter to the first bone and a second filter to the second bone, each of the first filter and the second filter, upon respective application to the first bone and the second bone, dampening the motion of the first vertex of the first bone by a first amount and dampening the motion of the second vertex by a second amount different from the first amount.

18. The VR computer as in claim 17, wherein the controlling circuitry configured to receive the request is further configured to define an anchor vertex, the anchor vertex being included in the first bone;

wherein the motion includes a translation component and a rotation component; and wherein the first filter is an identity filter that, when applied to the first bone, dampens the translation component of the motion of the anchor vertex by zero distance and dampens the rotation component of the motion of the anchor vertex by zero degrees so that the anchor vertex moves along a path according to the rigid transformation.

19. The VR computer as in claim 18, wherein the object includes a first region that includes the anchor vertex, a second region including the second vertex, and a third region between the first region and the second region in which the object is deformed, the second vertex being remote from the anchor vertex, and wherein the controlling circuitry is further configured to perform a deformation operation on vertices within the third region to produce a deformed object with in the third region.

20. The VR computer as in claim 18, wherein the controlling circuitry configured to perform the deformation operation on the vertices within the third region is further configured to map a position of each of the vertices within the third region according to a continuous mapping function, the continuous mapping function having a zero slope at boundaries between the first region and the third region and between the second region and the third region.

\* \* \* \* \*